(12) United States Patent
Miki

(10) Patent No.: US 6,704,640 B2
(45) Date of Patent: Mar. 9, 2004

(54) ENGINE CONTROL DEVICE

(75) Inventor: Akira Miki, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 43 days.

(21) Appl. No.: 10/170,169

(22) Filed: Jun. 11, 2002

(65) Prior Publication Data

US 2003/0139872 A1 Jul. 24, 2003

(30) Foreign Application Priority Data

Jun. 15, 2001 (JP) ........................ 2001-182112

(51) Int. Cl.⁷ .................. F02D 45/00; F02D 41/34
(52) U.S. Cl. .................. 701/104; 701/105; 701/103; 123/480; 123/525
(58) Field of Search ............... 701/103, 104, 701/102, 115, 105; 123/480, 488, 525

(56) References Cited

U.S. PATENT DOCUMENTS 4,479,186 A * 10/1984 Takao et al. ............ 701/104
4,919,100 A * 4/1990 Nakamura ............ 123/488
4,930,481 A * 6/1990 Fujimoto et al. ............ 123/481

FOREIGN PATENT DOCUMENTS

| JP | 6-168147 | 6/1994 | |
| JP | 8-284704 | 10/1996 | |
| JP | 9-242590 | 9/1997 | |
| JP | 2002-371899 | * 12/2002 | ............ F02D/41/34 |

* cited by examiner

Primary Examiner—Hieu T. Vo
(74) Attorney, Agent, or Firm—Christie, Parker & Hale, LLP

(57) ABSTRACT

To simplify a constitution of an engine control device operated using another fuel different from a predetermined fuel. The engine control device includes: a main computer 1 to output a signal on the supposition that the predetermined fuel is used; and a sub computer 2 to calculate and output only an injection signal on the supposition that another fuel is used. The sub computer conducts injection control on another fuel according to the injection signal or ignition signal outputted from the main computer and further according to the output of a sensor. Control, except for injection control, is conducted according to a signal outputted from the main computer.

8 Claims, 12 Drawing Sheets

Fig.2

(A) INJECTION SIGNAL FROM THE MAIN COMPUTER (B) INJECTION SIGNAL FROM THE SUB COMPUTER

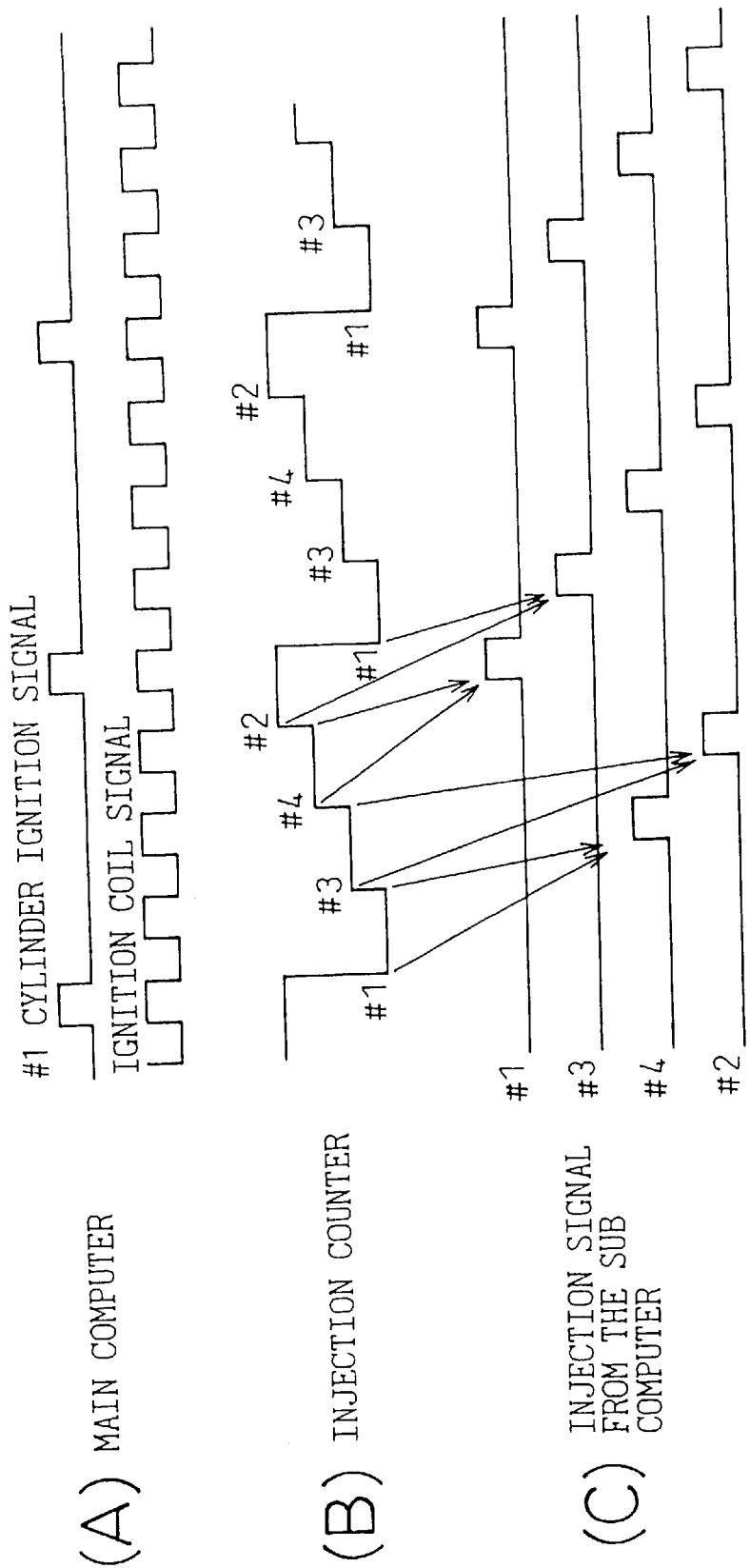

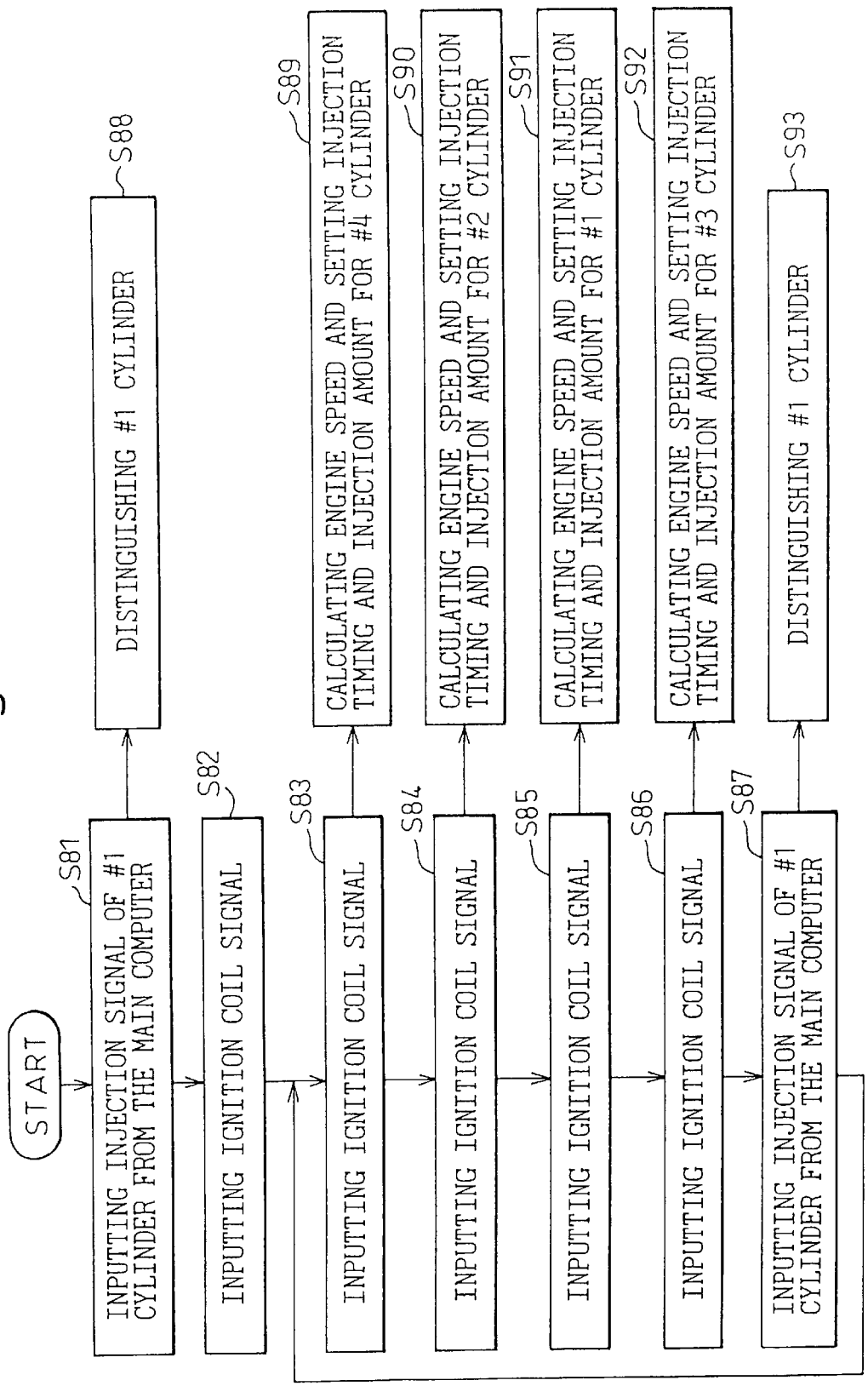

ENGINE CONTROL DEVICE

CROSS-REFERENCE TO RELATED APPLICATION

This application claims priority of Japanese Patent Application No. 2001-182112, filed on Jun. 15, 2001.

BACKGROUND OF THE INVENTION

1. Field of the Invention

The present invention relates to an engine control device. More particularly, the present invention relates to an engine control device for operating an engine, which is originally operated using a predetermined fuel, using another fuel different from the original fuel.

2. Description of the Related Art

Recently, attempts have been made to operate an engine, which is operated using a predetermined fuel, using another fuel different from the original fuel. For example, an attempt has been made to use inexpensive LPG (or CNG) in a gasoline engine. In this case, one engine is provided with two different fuel supply passages where one is a supply passage to supply gasoline and the other is a supply passage to supply LPG. Concerning the computer for controlling the engine, there are provided two different computers, one is a computer to control the engine when gasoline is supplied to the engine as fuel and the other is a computer to control the engine when LPG is supplied to the engine as fuel. Each computer outputs an ignition signal, injection signal and others according to the outputs of various sensors such as an engine speed sensor signal, cylinder signal and others.

As described above, in the case of a conventional engine control device to control an engine which is operated by fuel different from original one, a computer is provided for each fuel, and each computer conducts control under the condition that the objective fuel is used in the engine.

SUMMARY OF THE INVENTION

It is an object of the present invention to provide an engine control device, the constitution of which is simple, which is used for an engine to be originally operated using a predetermined fuel, in which the engine is operated using another fuel different from the predetermined one.

The present invention has been accomplished to attain the above object.

An engine control device of the present invention comprises: a main computer for controlling an engine which outputs an ignition signal and injection signal according to an output signal of a sensor on the supposition that a predetermined fuel is used in the engine; and a sub computer for outputting an injection signal according to a signal outputted from the main computer on the supposition that another fuel, different from the predetermined fuel, is used in the engine.

In the engine control device of the present invention, the main computer outputs an ignition signal and injection signal on the supposition that predetermined fuel is used in an engine. The igniter is operated by this ignition signal. The sub computer operates as a computer exclusively used for injection control, that is, the sub computer calculates and outputs an injection signal according to an injection signal or ignition signal outputted from the main computer on the supposition that another fuel, different from the original fuel, is supplied to an engine. The injector operates according to the injection timing and injection amount determined by the injection signal outputted from the sub computer. Ignition control and other control, except for control conducted by the injection signal, are executed by the main computer.

According to the present invention, even when an engine to be operated by predetermined fuel is operated by another fuel different from predetermined fuel, it is possible to conduct injection control appropriate for another fuel, that is, it is possible to obtain injection timing or injection amount appropriate for another fuel. Due to the foregoing, even when another fuel is used, the engine can be operated in the most appropriate condition. Further, engine control, in which another fuel different from the original fuel is used, can be realized by a simple constitution in which a sub computer only for calculating an injection signal is added.

In this connection, in the case where the engine is operated by the original fuel, an injection signal outputted from the main computer may be inputted into the injector.

Concerning the signal outputted from the main computer into the sub computer, it is possible to use an injection signal, ignition signal or ignition coil signal outputted from the main computer on the supposition that predetermined fuel is supplied to the engine. In addition to the signals outputted from the main computer, the sub computer can use a signal outputted from a crank angle sensor.

BRIEF DESCRIPTION OF THE DRAWINGS

The above object and features of the present invention will be more apparent from the following description of the preferred embodiment with reference to the accompanying drawings, wherein:

FIG. 2 is a waveform view showing the first example of injection signal generating process conducted in the sub computer shown in FIG. 1;

FIG. 11 is a wave form view showing the sixth example of injection signal generating process conducted in the sub computer shown in FIG. 1; and FIG. 12 is a flow chart for realizing the process shown in FIG. 11.

DESCRIPTION OF THE PREFERRED EMBODIMENTS

Referring to the accompanying drawings, an embodiment of the present invention, in which LPG is supplied to a four cylinder gasoline engine as fuel, will be explained below. In this connection, it should be noted that the type of an engine and fuel to be supplied to the engine are not limited to this specific embodiment. For example, it is possible to provide an embodiment in which natural gas is supplied to a gasoline engine. Alternatively, it is possible to provide an embodiment in which gasoline or natural gas is supplied to an LPG engine.

Figure 1:
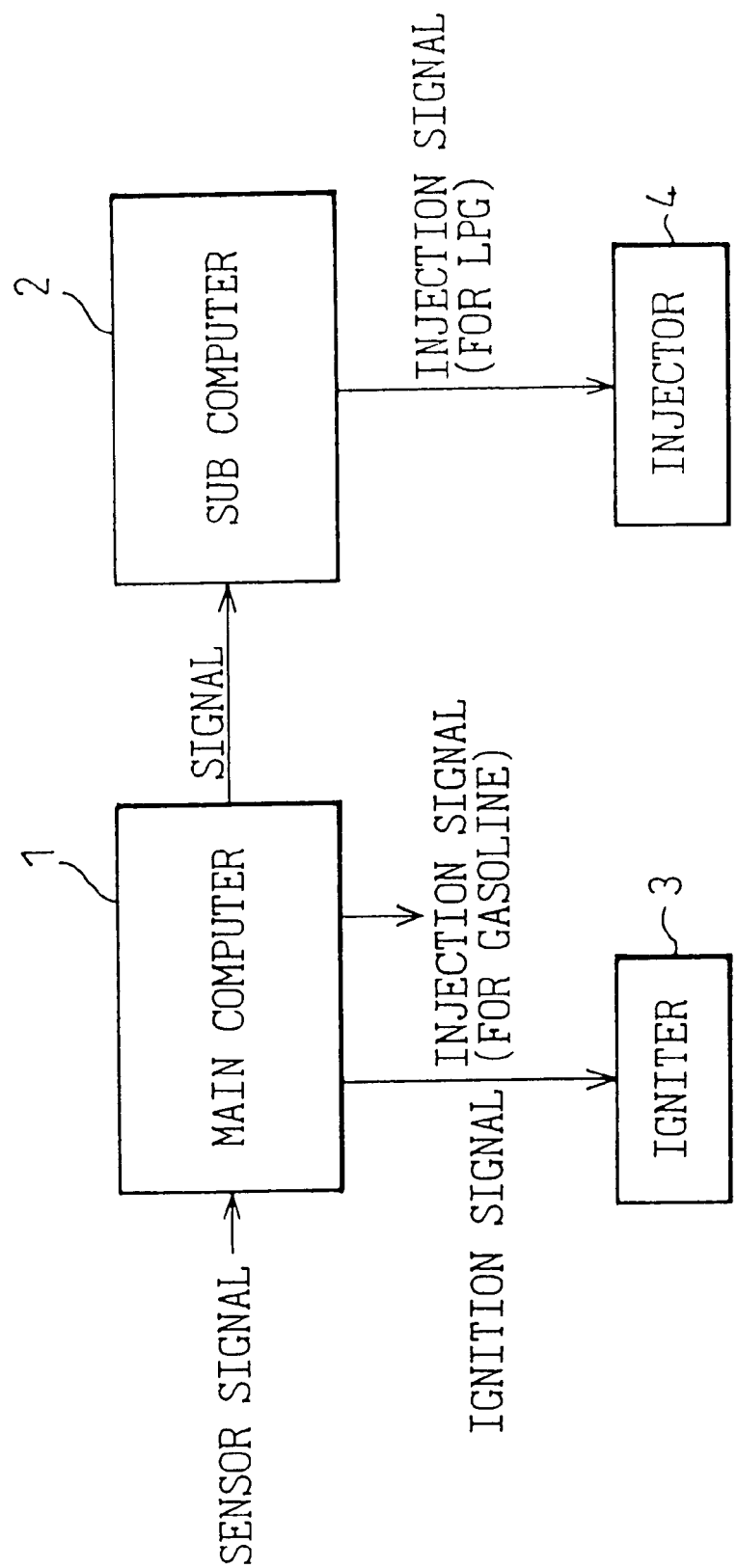
FIG. 1 is a view showing a circuit structure of an engine control device to which the present invention is applied.

Referring to FIG. 1, a circuit structure of the engine control device will be explained as follows.

An ECU (Electric Control Unit), which is originally provided in the control unit of an gasoline engine, is used as a main computer 1. In addition to that, there is provided a sub computer 2.

According to output signals of various sensors (not shown), the main computer 1 calculates and outputs an injection signal and an ignition signal on the supposition that gasoline is supplied to an engine as fuel. The constitution and operation of the main computer 1 are the same as those of ECU of a conventional gasoline engine. Therefore, explanations of the constitution and operation of the main computer 1 are omitted here.

An ignition signal outputted from the main computer 1 is inputted into the igniter 3.

Some of the signals outputted from the main computer 1 are inputted into the sub computer 2. According to the thus inputted signals, the sub computer 2 calculates an injection signal on the supposition that LPG is used as fuel. The thus calculated injection signal is inputted into the injector 4. In order for the sub computer 2 to generate the injection signal on the supposition that LPG is used as fuel, signals for detecting the engine speed and distinguishing the cylinder may be inputted from the main computer 1 or from the main computer 1 and the sensor to the sub computer 2.

According to the engine control device shown in FIG. 1, the igniter 3 is controlled by an ignition signal outputted from the main computer 1, and the injector 4 is controlled by an injection signal outputted from the sub computer 2. Therefore, it is unnecessary for the sub computer 2 to generate an ignition signal, and the structure of the sub computer 2 can be made simple so that it can generate an injection signal on the supposition that LPG is used as fuel.

In this connection, in the case where gasoline, which is the original fuel for the engine, is used as fuel in the circuit structure shown in the drawing, an injection signal outputted from the main computer 1 may be inputted into the injector 4.

Referring to FIGS. 2 to 12, explanations will be made into the processing of an injection signal output conducted by the sub computer 2.

FIG. 2 is schematic illustration showing an example in which the sub computer 2 calculates the injection time on the supposition that LPG is used as fuel according to the injection signal outputted from the main computer 1 on the supposition that gasoline is used as fuel.

The main computer 1 outputs an injection signal to each of the first to the fourth cylinder (#1 cylinder to #4 cylinder) on the supposition that gasoline is used as fuel. In item (A), there is shown an injection signal for #1 cylinder. As shown in item (B), the sub computer 2 sets an injection amount used for LPG at the timing of the inputted injection signal. In this connection, in the example of item (1), the injection amount is controlled by adding a correction amount to the continuation time or subtracting a correction amount from the continuation time. In the example of item (2), the injection amount is controlled by adding a correction amount to the amplitude of signal voltage or subtracting a correction amount from the amplitude of signal voltage. The examples of items (1) and (2) can be singly used. Alternatively, the examples of items (1) and (2) can be used being combined with each other.

In this example, the sub computer 2 only calculates an injection amount on the supposition that LPG is used as fuel and does not calculate the injection timing. Therefore, software of the sub computer 2 can be further simplified. However, in this embodiment, calculation of the injection timing is not conducted on the sub computer 2 side. Therefore, a problem may be encountered in which injection control cannot be conducted at the original timing, for example, asynchronous injection cannot be conducted.

Figure 3:
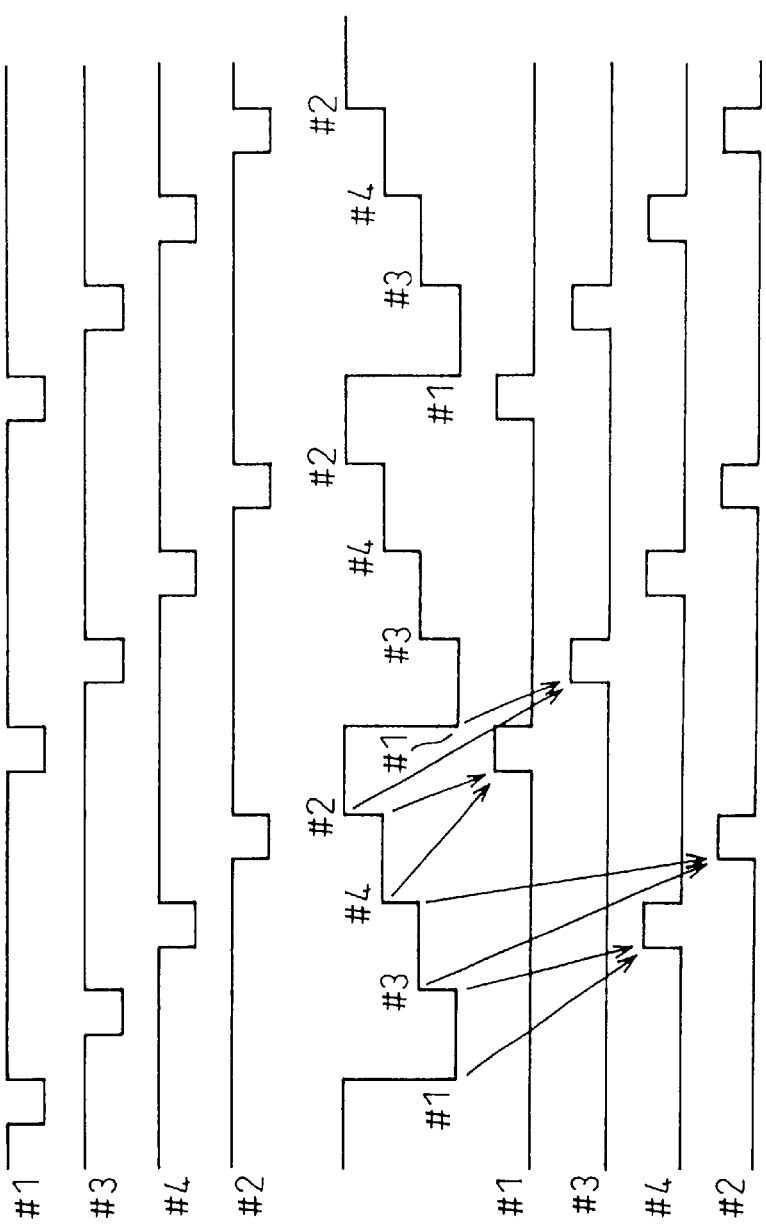
FIG. 3 is a waveform view showing the second example of injection signal generating process conducted in the sub computer shown in FIG. 1.
Figure 4:
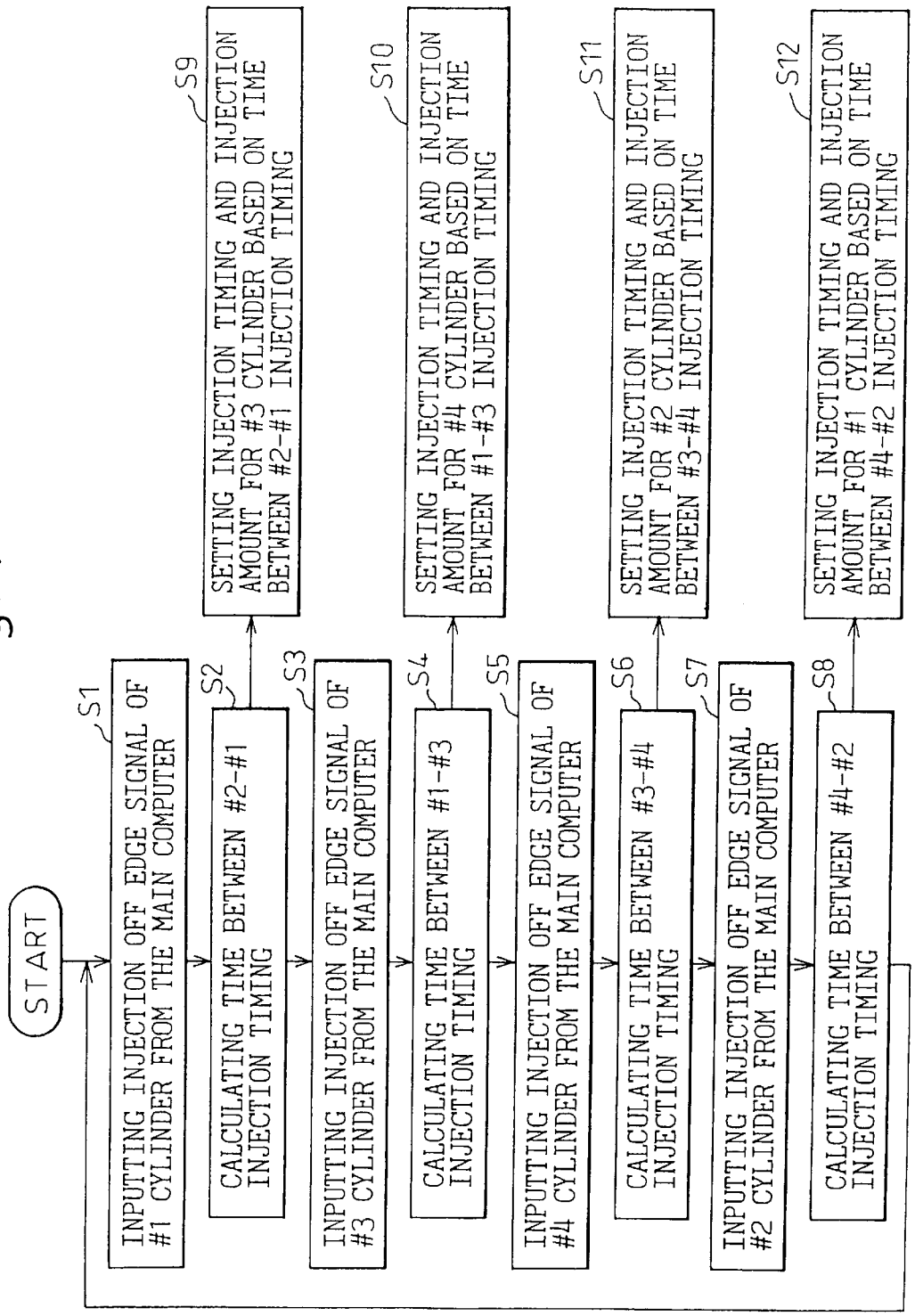
FIG. 4 is a flow chart for realizing the process shown in FIG. 3.

Referring to FIGS. 3 and 4, explanations will be made into an example in which the sub computer 2 calculates the injection timing and injection amount according to the injection signal outputted from the main computer 1.

Referring to the wave form diagram shown in FIG. 3, the flow chart shown in FIG. 4 will be explained as follows.

The main computer 1 outputs injection signals for #1 cylinder to #4 cylinder shown in FIG. 3(A) on the supposition that gasoline is used as fuel. When a falling edge of the injection signal of #1 cylinder is inputted from the main computer 1 (step S1 shown in FIG. 4), a period of time between the injection timing of #2 cylinder and that of #1 cylinder is calculated (step S2). The period of time between the injection timing of #2 cylinder and that of #1 cylinder can be obtained when an injection counter provided in software of the sub computer 2 counts a period of time from the falling edge of the injection signal of #2 cylinder to the falling edge of the injection signal of #1 cylinder. In this connection, in the example shown in the drawing, at first, the falling edge of the injection signal of #2 cylinder is not inputted. Therefore, it is impossible to calculate the period of time between the injection timing of #2 cylinder and that of #1 cylinder. Therefore, the processing of step S2 and that of the successive step S3 are not conducted.

A count value of this injection counter expresses an engine speed. According to this count value, the injection timing and injection amount of LPG for #3 cylinder are set (step S9). This state is shown in FIG. 3(C). In this connection, a method of calculating the timing to start the injection signal for LPG and a method of calculating the injection amount are well known. Therefore, explanations of the methods are omitted here.

Next, a falling edge of the injection signal of #3 cylinder outputted from the main computer 1 is inputted (step S3). Then, a period of time between the injection timing of #1 cylinder and that of #3 cylinder is calculated (step S4). The period of time between the injection timing of #1 cylinder and that of #3 cylinder can be obtained when an injection counter counts a period of time from the falling edge of the injection signal of #1 cylinder to the falling edge of the injection signal of #3 cylinder. According to the thus obtained count value, the injection timing and injection amount of LPG for #4 cylinder can be set (step S10).

In the same manner, when a falling edge signal of the injection signal of #4 cylinder, which is outputted from the main computer 1, is inputted (step S5), a period of time between the injection timing of #3 cylinder and that of #4 cylinder is calculated (step S6). According to a period of time between the injection timing of #3 cylinder and that of #4 cylinder, an injection signal and injection amount of LPG for #2 cylinder is set (step S11). When an off signal of the injection signal of #2 cylinder is inputted (step S7), a period of time between the timing of #4 cylinder and that of #2 cylinder (step S8) is calculated. According to the period of time between the injection timing of #4 cylinder and that of #2 cylinder, an injection signal and injection amount of LPG for #1 cylinder are set (step S12).

Further, when an off signal of #1 cylinder is inputted (step S1), a period of time between the injection timing of #2 cylinder and that of #1 cylinder is calculated (step S2). According to the period of time between the injection timing of #2 cylinder and that of #1 cylinder, an injection signal of LPG for #3 cylinder is set (step S9). In step S9 of the present time, the falling edge of the injection signal of #2 cylinder has already been inputted. Therefore, it is possible to calculate the period of time between the injection timing of #2 cylinder and that of #1 cylinder. After that, the same processing is repeated.

According to this example, even when only a sub computer 2 in which simple software is installed is added, the injection timing can be controlled. Therefore, control of asynchronous injection can be conducted.

In this connection, in this example, the timing is calculated by using the falling edge of the injection signal outputted from the main computer 1 as a trigger. It is possible to start counting the injection counter by using a rising edge as a trigger instead of this falling edge.

Figure 5:
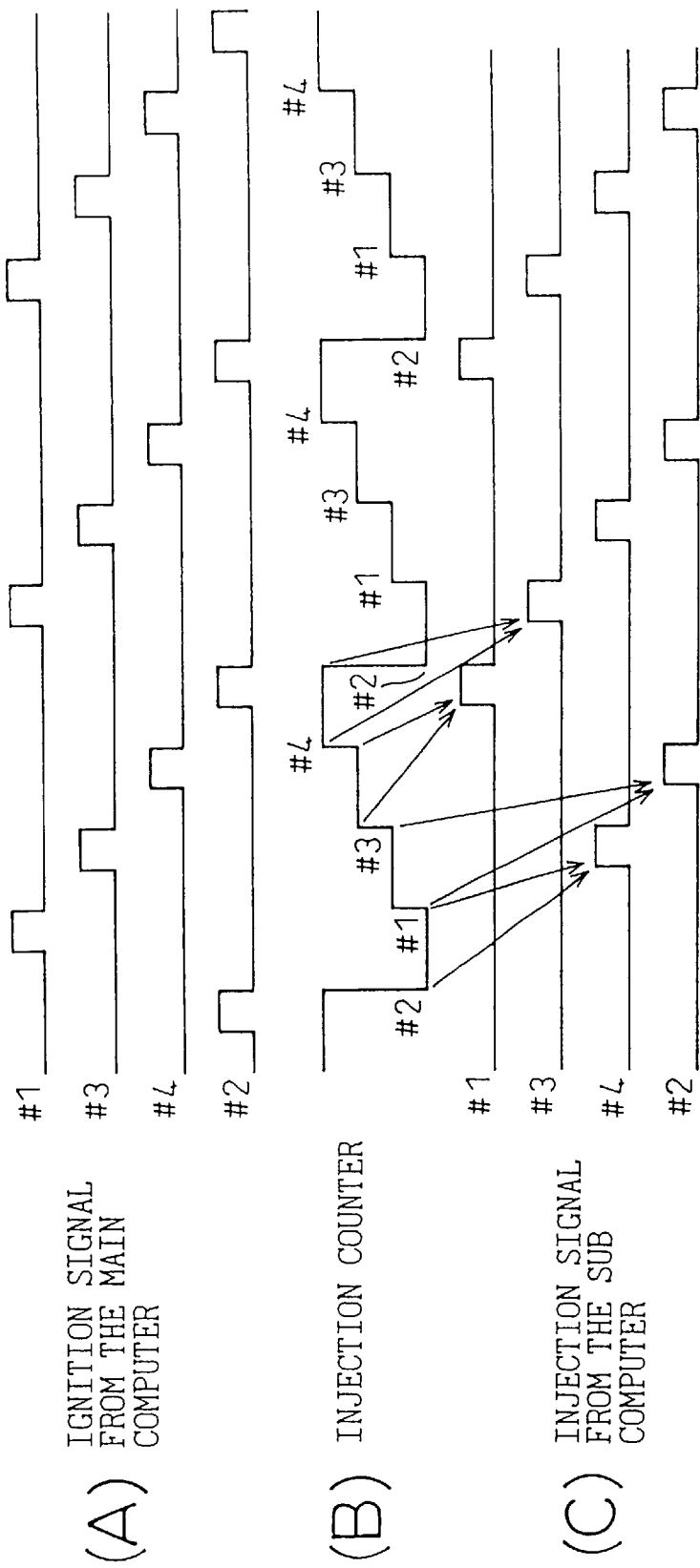
FIG. 5 is a waveform view showing the third example of injection signal generating process conducted in the sub computer shown in FIG. 1.
Figure 6:
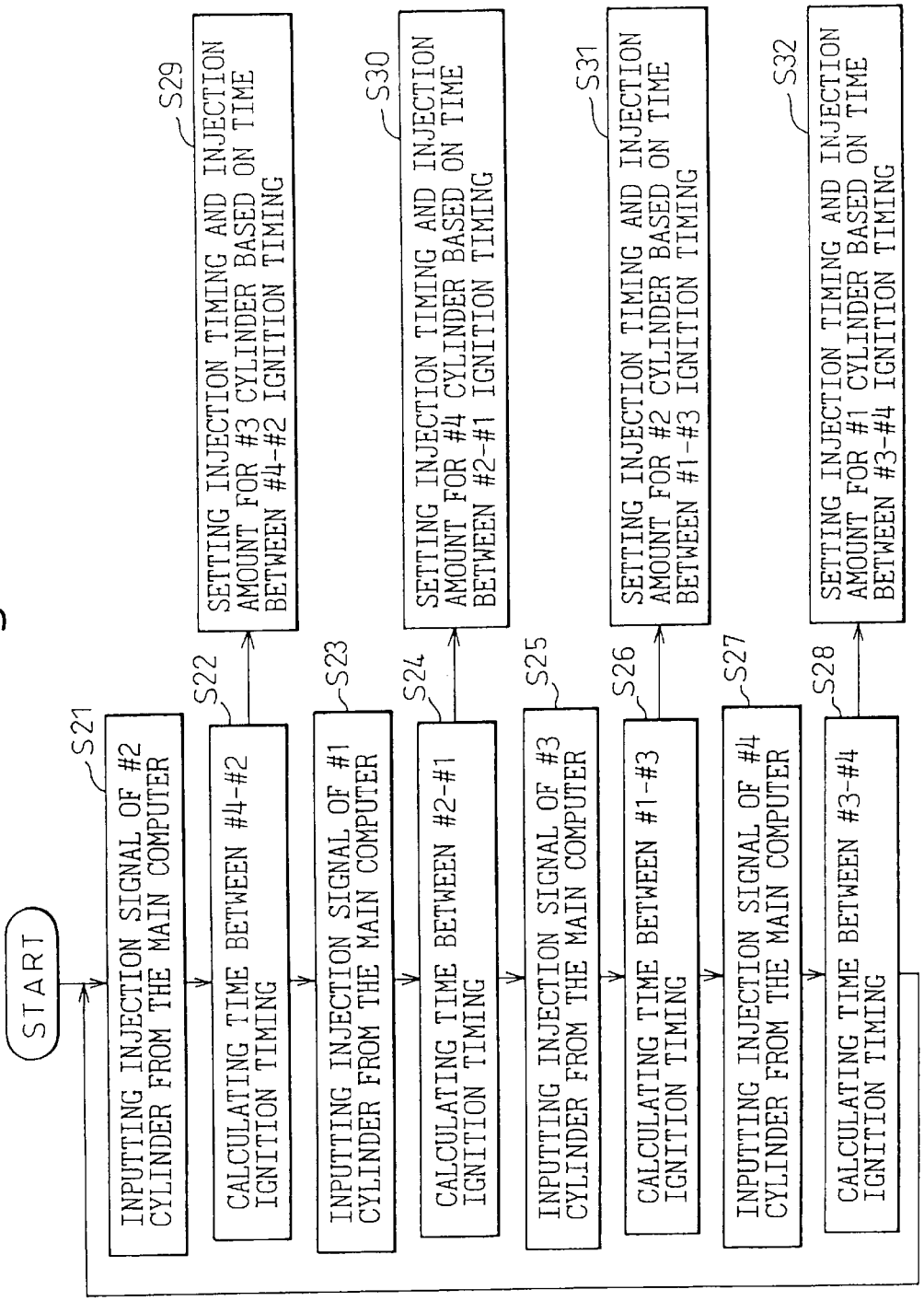
FIG. 6 is a flow chart for realizing the process shown in FIG. 5.

FIGS. 5 and 6 are views showing an example in which the sub computer 2 calculates the injection timing and injection amount according to the ignition signal outputted from the main computer 1.

The example shown in FIGS. 3 and 4 is based on the injection signal outputted from the main computer 1. On the other hand, this example is base on the ignition signal outputted from the main computer 1. In order to avoid the overlapping explanations, only different points from the example shown in FIGS. 3 and 4 will be explained here.

In steps S21, S23, S25 and S27 shown in FIG. 6, ignition signals of #2, #1, #3 and #4 cylinders, which are outputted from the main computer 1, are inputted. Between the injection signal and the ignition signal outputted from the main computer 1, there is a difference in timing. Because of this difference in timing, in this example, the ignition signal of LPG of #3 cylinder is calculated by the ignition signals of the #4 and #2 cylinder (step S29), injection of LPG of #4 cylinder is controlled by the ignition signal of #2 and #1 cylinders (step S30), injection of LPG of #2 cylinder is controlled by the ignition signal of #1 and #3 cylinder (step S31), and injection of LPG of #1 cylinder is controlled by the ignition signal of #3 and #4 cylinder (step S32).

In this connection, in steps S21, S23, S25 and S27, instead of the falling edge of the ignition signal, the rising edge may be used as a trigger of the ignition signal.

Figure 7:
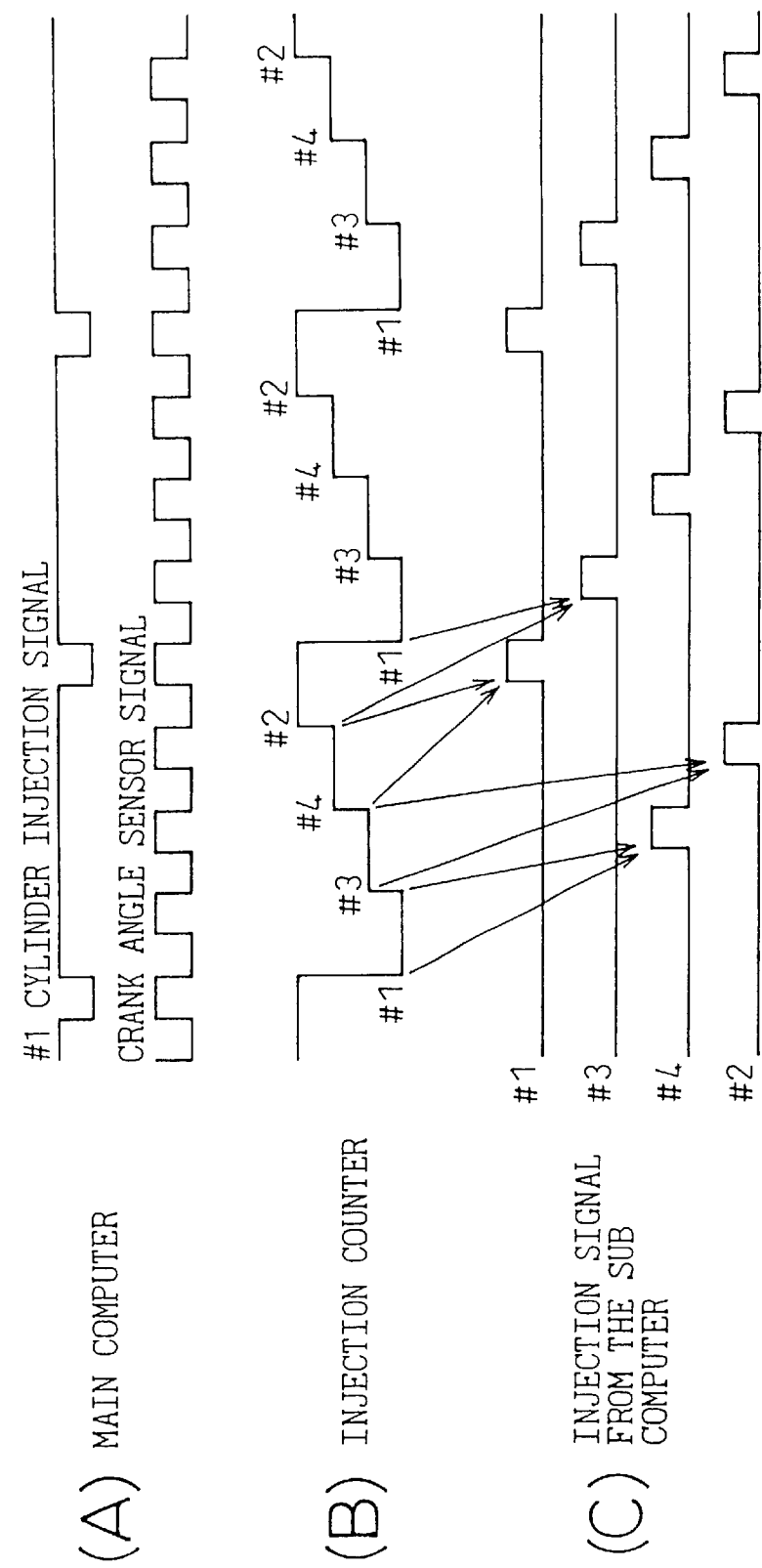
FIG. 7 is a wave form view showing the fourth example of injection signal generating process conducted in the sub computer shown in FIG. 1.
Figure 8:
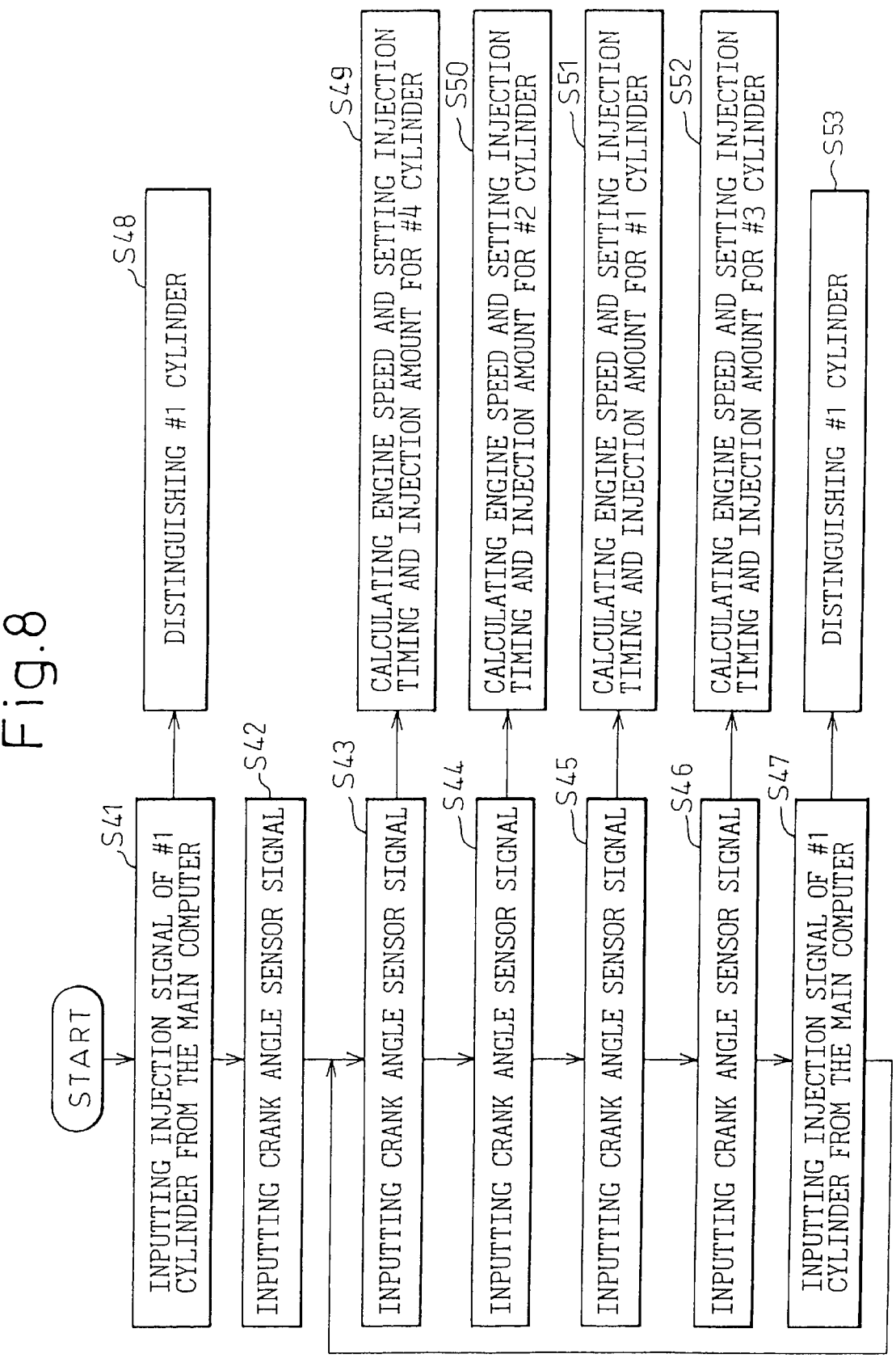
FIG. 8 is a flow chart for realizing the process shown in FIG. 7.

Referring to FIGS. 7 and 8, there is shown an example in which the injection timing and injection amount are calculated by the sub computer 2 according to the injection signal outputted by the main computer 1 and also according to the signal outputted from the crank angle sensor.

In this example, the cylinder is distinguished according to the injection signal of #1 cylinder outputted from the main computer 1, and the engine speed is calculated according to the signal outputted from the crank angle sensor.

As shown in FIG. 7(A), the injection signal for #1 cylinder outputted from the main computer 1 and the signal outputted from the crank angle sensor are used as input signals to be inputted into the sub computer 2.

The main computer 1 outputs an injection signal for #1 cylinder (step S41), and then the cylinder is distinguished (step S48). When the crank angle sensor signal is inputted (step S42), it can be judged that this crank angle sensor signal is a signal corresponding to #1 cylinder and that the input of the next crank angle sensor signal (step S43) is a signal corresponding to #3 cylinder.

The injection counter starts counting while the falling edge of the crank angle sensor signal is being used as a trigger. According to the count value of the injection counter, the engine speed is calculated. According to the cylinder discrimination conducted in step S48, the injection timing and injection amount of LPG for #4 cylinder are set (step S49). In this connection, it possible to use the rising edge as a trigger instead of the falling edge.

After that, in the same manner, the crank angle sensor signal is repeatedly inputted (steps S44 to S46), and the engine speed is calculated with respect to each of #2, #1 and #3 cylinders, so that the injection timing and injection amount of LPG are set (steps S50 to S52). FIG. 7(B) is a view showing a state of the injection counter, and FIG. 7(C) is a view showing an injection signal of LPG for each of #1 to #4 cylinders.

When the injection signal of #1 cylinder is outputted from the main computer 1 in step S47, cylinder discrimination is conducted in step S53, and the program returns to step S43. After that, the same processing is repeatedly conducted.

Figure 9:
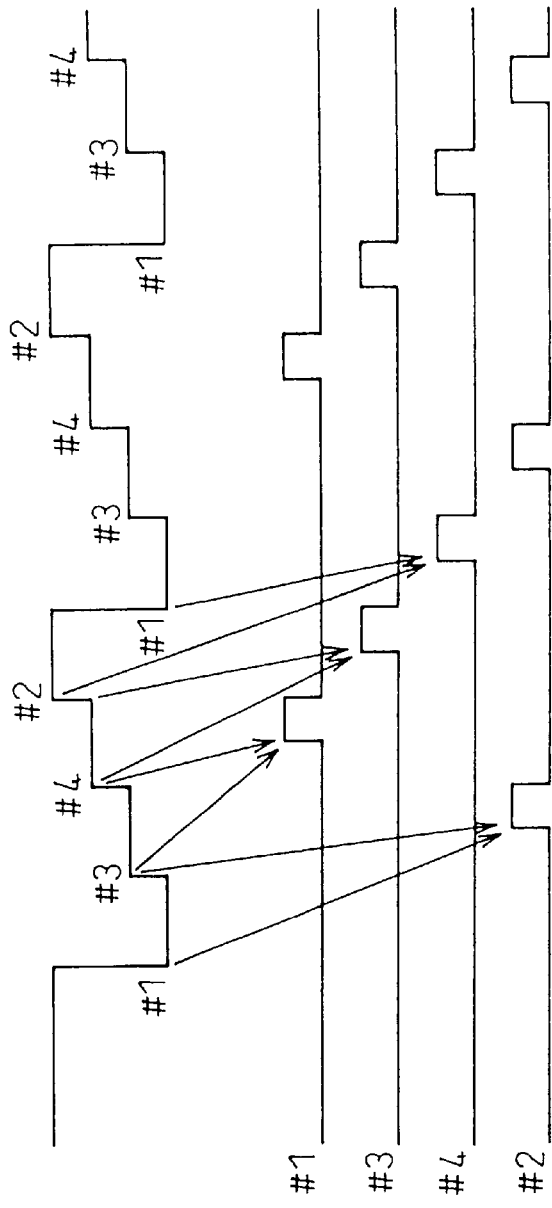
FIG. 9 is a wave form view showing the fifth example of injection signal generating process conducted in the sub computer shown in FIG. 1.
Figure 10:
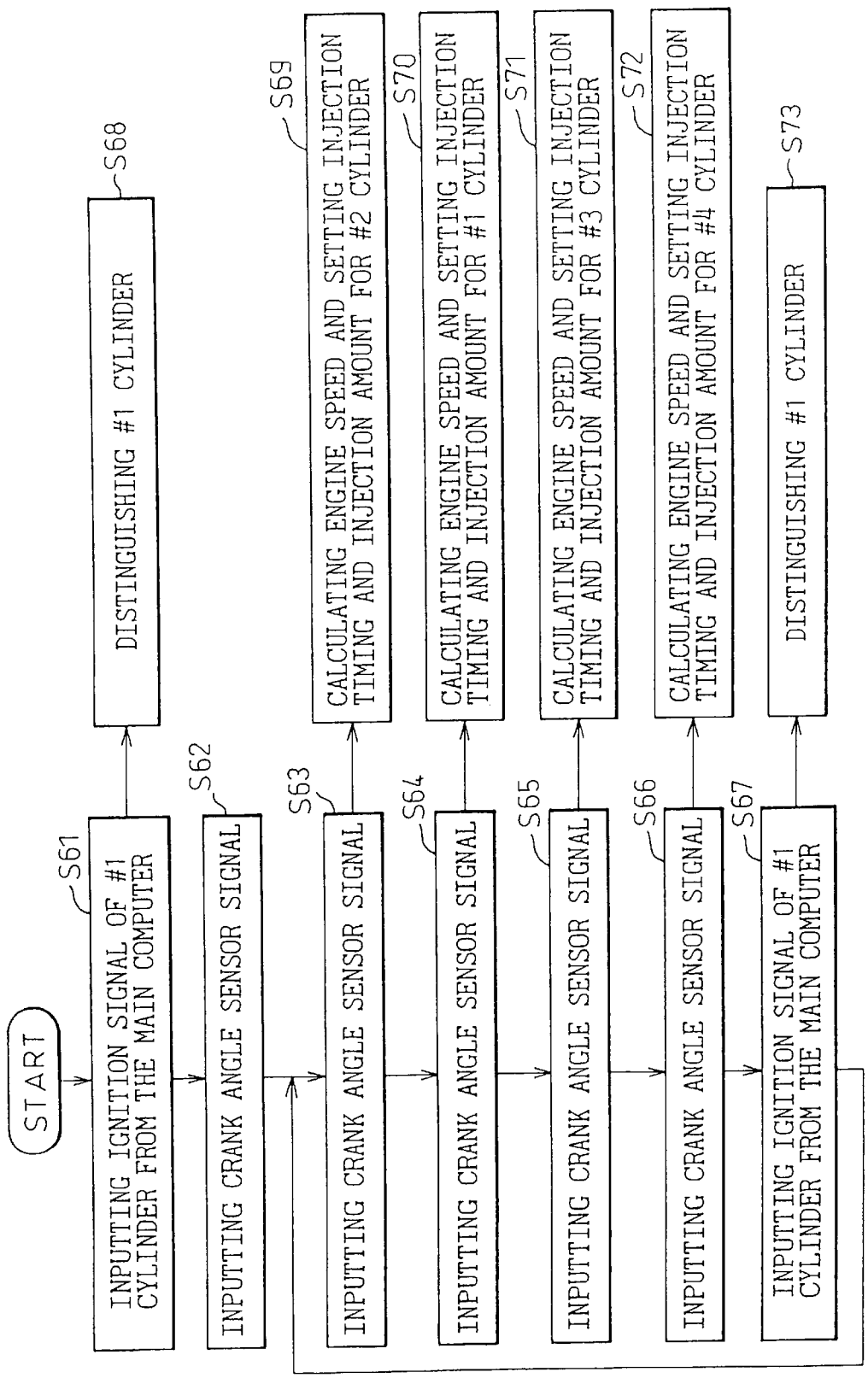
FIG. 10 is a flow chart for realizing the process shown in FIG. 9.

Referring to FIGS. 9 and 10, explanations will be made into an example in which the sub computer 2 calculates the injection timing and injection amount according to the ignition signal outputted from the main computer 1 and also according to the signal outputted from the crank angle sensor.

Different from the example shown in FIGS. 7 and 8, in this embodiment, the ignition signal is used instead of the injection signal outputted from the main computer 1. Timing of the injection signal and that of the ignition signal are different from each other. Therefore, the injection timing of LPG for each cylinder is different. Except for the above points, no difference exists between the two examples. Therefore, the overlapping explanations will be omitted here.

When the main computer 1 outputs an ignition signal for #1 cylinder (step S61), cylinder discrimination is conducted (step S68). When the crank angle sensor signal is inputted (step S62), it can be judged that this is a signal corresponding to #1 cylinder and that the input of the next crank angle sensor signal (step S63) is a signal corresponding to #2 cylinder.

In the same manner, the signal of the crank angle sensor is repeatedly inputted (steps S64 to S66), and the engine speed is calculated and the ignition timing and ignition amount of LPG are set for each of #1, #3 and #4 cylinders (steps S70 to S72).

Referring to FIGS. 11 and 12, explanations will be made into an example in which the sub computer 2 calculates the injection timing and injection amount according to the injection signal and ignition coil signal of #1 cylinder outputted from the main computer 1.

This example is applied to a case in which the crank angle sensor cannot be used in the example shown in FIGS. 7 and 8. In this example, cylinder discrimination is conducted according to the injection signal of #1 cylinder, and the engine speed is judged by the ignition coil signal of the main computer 1. Other points are the same as those of the example shown in FIGS. 7 and 8. Therefore, the overlapping explanations will be omitted here.

According to the present invention, the structure of the control device can be simplified in an engine control device for operating an engine, which is operated using predetermined fuel, when it is operated using another fuel different from the predetermined fuel.

What is claim is:

1. An engine control device comprising:
    a main computer for controlling an engine which outputs an ignition signal and injection signal according to an output signal of a sensor on the supposition that predetermined fuel is used for the engine; and
    a sub computer for outputting an injection signal according to a signal outputted from the main computer on the supposition that another fuel different from the predetermined fuel is used for the engine.

2. An engine control device according to claim 1, wherein the sub computer generates the injection signal by calculating the injection timing and injection amount according to the injection signal outputted from the main computer.

3. An engine control device according to claim 2, wherein the sub computer calculates the injection timing and injection amount according to a falling edge of the injection signal.

4. An engine control device according to claim 2, wherein the sub computer calculates the injection timing and injection amount according to a rising edge of the injection signal.

5. An engine control device according to claim 1, wherein the sub computer generates the injection signal by calculating the injection timing and injection amount according to the ignition signal outputted from the main computer.

6. An engine control device according to claim 1, wherein the sub computer generates the injection signal by calculating the injection timing and injection amount according to the signal outputted from a crank angle sensor and the injection signal for one cylinder outputted from the main computer.

7. An engine control device according to claim 1, wherein the sub computer generates the injection signal by calculating the injection timing and injection amount according to the signal outputted from a crank angle sensor and also according to the ignition signal for one cylinder outputted from the main computer.

8. An engine control device according to claim 1, wherein the sub computer generates the injection signal by calculating the injection timing and injection amount according to the injection signal for one cylinder outputted from the main computer and also according to the ignition coil signal.

\* \* \* \* \*